(12) United States Patent
Ambardekar

(10) Patent No.: US 7,357,746 B2
(45) Date of Patent: Apr. 15, 2008

(54) ECCENTRIC GEARBOX

(76) Inventor: Vishvas Prabhakar Ambardekar, Plot No B 82 Flat No. 1, Tutshibagwale Colongy Sahakar, Nagar N 2 Pune 411009 (IN)

( * ) Notice: Subject to any disclaimer, the term of this patent is extended or adjusted under 35 U.S.C. 154(b) by 230 days.

(21) Appl. No.: 10/520,365

(22) PCT Filed: Jul. 2, 2002

(86) PCT No.: PCT/IN02/00143

§ 371 (c)(1),
(2), (4) Date: Aug. 10, 2005

(87) PCT Pub. No.: WO2004/005756

PCT Pub. Date: Jan. 15, 2004

(65) Prior Publication Data

US 2005/0250612 A1    Nov. 10, 2005

(51) Int. Cl.
*F16H 3/70* (2006.01)
(52) U.S. Cl. ........................................ 475/170
(58) Field of Classification Search ............. 475/162, 475/163, 165, 166, 169, 170, 177; 74/640
See application file for complete search history.

(56) References Cited

U.S. PATENT DOCUMENTS

| | | | | |
|---|---|---|---|---|
| 1,984,235 A * | 12/1934 | Sharpe | ......................... | 475/171 |
| 4,807,494 A * | 2/1989 | Lew | ........................... | 475/166 |
| 4,884,473 A * | 12/1989 | Lew | ........................... | 475/168 |
| 5,324,240 A * | 6/1994 | Guttinger | .................... | 475/162 |
| 5,425,683 A * | 6/1995 | Bang | ........................... | 475/162 |
| 7,216,845 B1 * | 5/2007 | Jones | .......................... | 251/248 |
| 2003/0054912 A1 * | 3/2003 | Nohara et al. | .............. | 475/162 |

* cited by examiner

*Primary Examiner*—Dirk Wright
(74) *Attorney, Agent, or Firm*—Gifford, Krass, Spinkle, Anderson & Citkowski, P.C.

(57) ABSTRACT

An eccentric gearbox with selectable large speed ratio, in this gearbox many eccentric gear (8, 12, 16) pairs are assembled in parallel, and are connected to a common input shaft (1) and a common output shaft (2). In every gear pair (8, 12, 16), one gear keeps its orientation fixed with respect to a fixed part called as fixed gear (8, 12, 16) and another gear that rotates about its own axis is called as moving gear (7, 11, 15). Difference in number of teeth on the two gears of a gear pair is kept to one tooth or more. Through proper selection of a particular gear pair any speed ratio can be selected. In this way, it is possible to make a compact gearbox, with multiple large speed ratios. Such a gear box can be used in automobiles, robot manipulators, earth moving equipments, space applications, toys, hand held tools and many other applications.

10 Claims, 3 Drawing Sheets

ECCENTRIC GEARBOX

TECHNICAL FIELD

Figure 1:
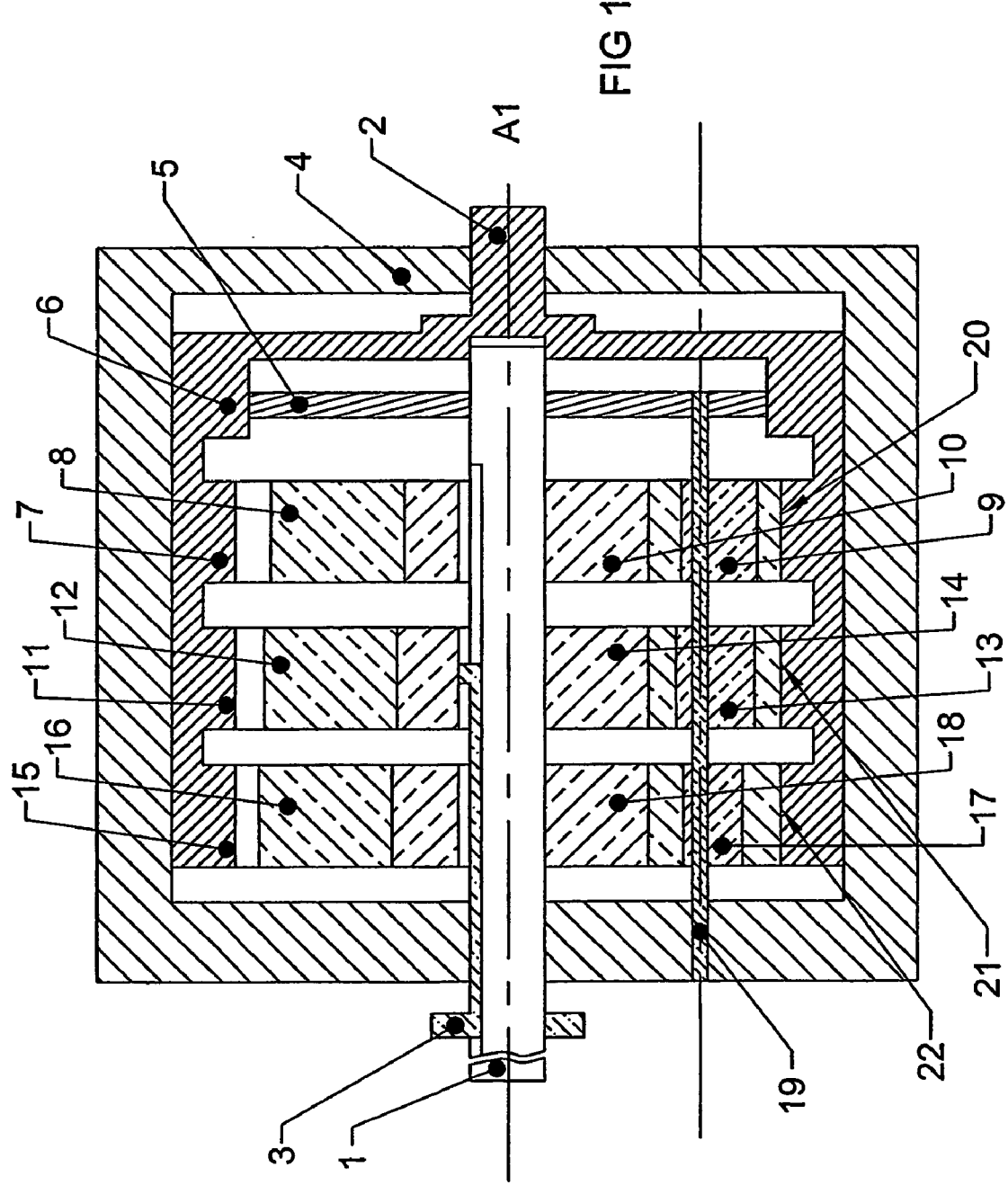

This invention deals with large speed ratio eccentric gearbox with selectable speed ratio. In this gearbox many eccentric gear pairs are assembled in parallel, and are connected to a common input shaft and a common output shaft. In every gear pair, one gear called fixed gear keeps its orientation unchanged with respect to a fixed part and another gear that rotates about its own axis is called as moving gear. The point of contact is moved on to the pitch circle of the fixed gear through some mechanism connected and the moving gear is connected to an output shaft. Difference in number of teeth on the two gears of an eccentric gear pair is kept to one tooth or more. Through proper selection of a particular gear pair any speed ratio from available speed ratios can be selected. In this way, it is possible to make a compact gearbox, with multiple (two or more) speed ratios, to have large speed ratios between input and output shafts. These types of gearboxes are useful in automobiles, and in many other applications where turbines are used mainly as prime movers. Such a gear box can be used in automobiles, robot manipulators, earth moving equipments, space applications, toys, hand held tools and in many other applications.

BACKGROUND ART

Existing patents:
U.S. Pat. No. 3,996,816, dated Dec. 14, 1976, titled "Harmonic Drive".
U.S. Pat. No. 3,546,972, dated Dec. 15, 1970, titled "Profile shifted involute internal gearing".
U.S. Pat. No. 5,324,240, dated Jun. 28, 1994, titled "Eccentric Gear System".

All the above-mentioned inventions deals with single speed ratio gear drives. In all these inventions it is difficult to have multiple speed ratio gearbox, from which a specific gear ratio can be selected. By using existing eccentric gear drives with turbines as a prime mover, it may be necessary to use a conventional gearbox in series with the eccentric drive.

This invention is based on the work done and applied for international patent bearing the international patent application number PCT/IN01/00150 dated Aug. 29, 2001; configuration 2 and configuration 4 are specifically used for present work. Using the configurations 2 and 4 it is possible to make an eccentric gearbox to have multiple (two or more) high speed ratios, any of the available speed ratios can be selected between input and output shaft by employing a suitable gear engagement mechanism. Though eccentric gearbox with any number of speed ratios can be made with following methodology, only three speed ratio gearboxes are explained below.

Definitions:
Internal gear—A circular gear with internal teeth.
External gear—A circular gear with external teeth.
Fixed gear—The gear with fixed orientation.
Moving gear—The gear that rotates about its own axis.
Pitch circle—A reference circle on the plane normal to the rotational axis of the gear, the diameter of the pitch circle is used for calculations.
Pitch Cylinder—A cylinder, co-axial to the rotational axis of the gear, that passes through the pitch circle of the gear. As most of the time the gear cross section is referred, only pitch circle is referred in the explanation that follows.

Point of contact—Theoretical common point on the pitch circles of the two meshing gears. The two pitch circles are tangential to each other on this point.

Line of contact—Theoretical common line on the pitch cylinders of the two meshing gears. The two pitch cylinders are tangential to each other on this line. This line is always parallel to the axes of the two gears and passes through the point of contact. As most of the time the gear cross section is referred, only point of contact is referred in the explanation that follows.

Figure 2:
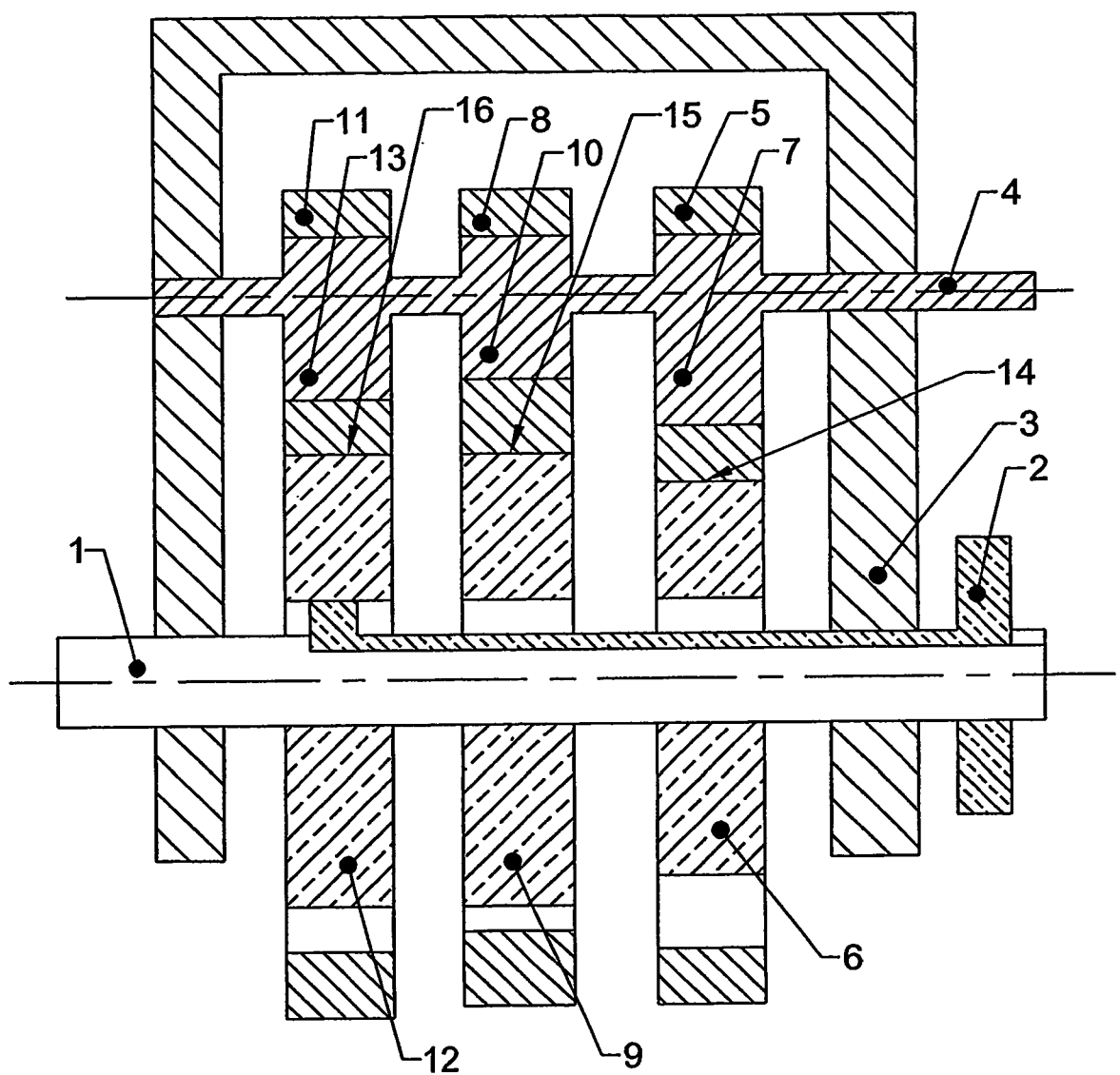
Figure 3:
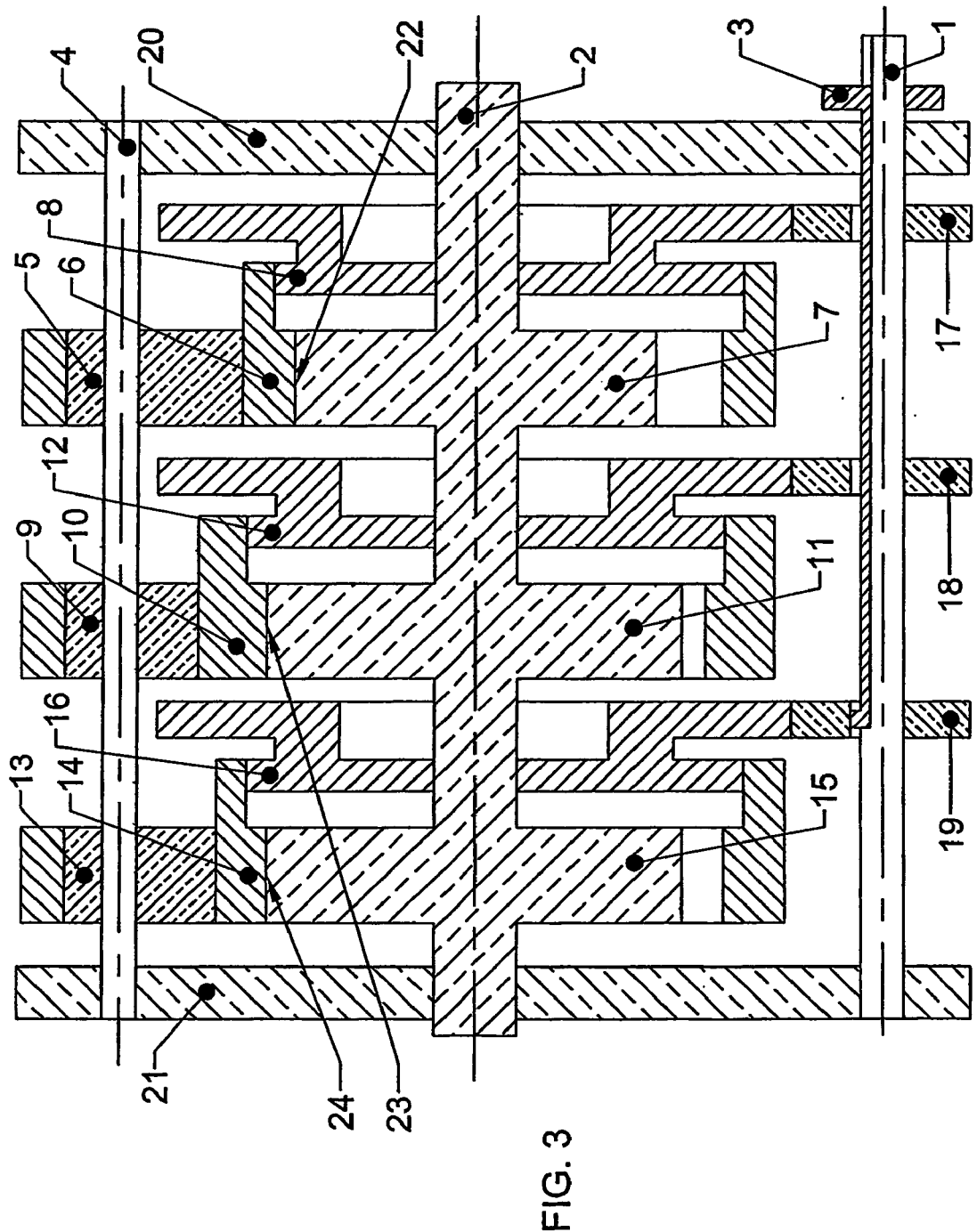

Eccentricity—Half the difference between the pitch circle diameters of the two meshing gears forming eccentric gear pair as in FIG. 1, FIG. 2 and FIG. 3. The eccentricity should preferably be same for all eccentric parts related to a particular gear pair.

Introduction:

A gearbox with large speed ratio is very useful. This type of gearbox uses eccentric gear pair for obtaining large speed ratio; this makes it-very compact in size for large speed ratio. With an eccentric gearbox, it may be possible to use a turbine as a prime mover for automobiles and for many other applications, without use of conventional gearbox. Use of such a gearbox can make very compact turbine-gearbox unit and can replace the conventional reciprocating engine-gearbox unit in future. An eccentric gearbox can allow utilizing the benefits of using turbine over the use of reciprocating internal combustion engine.

The working of such an eccentric gearbox is explained with the help of three drawings. These three drawings as listed below, give details of three different possible configurations of such a gearbox.

FIG. 1—Schematic sectional view of a three speed eccentric gearbox, with external gears as fixed gears and internal gears as moving gears. Input shaft is connected to the eccentrics and output shaft is co-axially connected to the internal gears.

FIG. 2—Schematic sectional view of a three speed eccentric gearbox, with external gears as moving gears and internal gears as fixed gears. Input shaft is connected to the eccentrics and output shaft is connected to the external gears.

FIG. 3—Schematic sectional view of a three speed eccentric gearbox, with external gears as moving gears and internal gears as fixed gears. Input shaft is connected to the additional driving gears and output shaft is connected to the external gears.

PRINCIPLE OF OPERATION

In FIG. 1, 1 is the input shaft, which is supported by the fixed member 4 at one end and output shaft 2 at the other end. Supporting disc 5 gives additional support to the input shaft. Output gear assembly 6 rotates freely in between 4 and 5. The input shaft rotates freely at the support by disc 5. The input shaft rotates freely in 4 and 2. The output shaft 2 and output gear assembly 6 is freely rotating with respect to the fixed part 4. Symbolic gear engagement mechanism 3 is placed to connect one of many (actual number of eccentrics is equal to that of eccentric gear pairs) eccentrics 10, 14, and 18 to the input shaft. These eccentrics 10, 14, 18 are guiding fixed gears 8, 12, 16 and are freely rotating in the gears 8, 12, 16. The gears 8, 12, 16 are kept in same orientation through the eccentrics 9, 13 and 17 which are either fixed or free to rotate on the shaft 19. There are minimum three similar assemblies of shaft 19 and eccentrics 9, 13 and 17. If the eccentrics 9, 13 and 17 are free to rotate on the shaft 19, then the shaft can be fixed to the supporting disc 5 and to the fixed member 4, otherwise the shaft should be free to rotate in supporting disc 5 and fixed member 4. This shaft 19 and the eccentrics 9, 13, 17 are arranged at minimum three places in such a way that all axes of the shafts 19 are parallel but all are not In the same plane. Shafts 19 are also supported by disc 5. Internal gear rims 7, 11, 15 are mounted on 6 and thus connected to the output shaft 2. Eccentricities of 9, 13 and 17 are independent of each other. Eccentricity of all 9's and 10 must be approximately same. Similarly eccentricity of all 13's and all 17's should be approximately same as that of 14 and 18 respectively. Eccentrics 10, 14 and 18 are put on shaft 1 in such a way that their axial movement along axis Al is restricted. Only one of the eccentrics 10, 14, 18 is engaged to shaft 1 at a time through gear engagement mechanism 3 and other two are free to rotate on shaft 1.

When input shaft 1 is rotated the eccentric 14 (FIG. 1) also rotates, this forces axis of gear 12 to revolve around axis A1 and thus the point of contact is forced to move on the pitch circle of the fixed gear 12. Three numbers of eccentric 13 maintain the orientation of the gear 12. The gear rim 11 and thus output shaft 2 rotates about axis A1. If gear 12 has N number of teeth and gear rim 11 has M number of teeth, where M>N, then the speed ratio obtained is M:(M−N).

In FIG. 1, it is also possible to rigidly connect the eccentrics 10, 14 and 18 on to the input shaft 1 and use a gear engagement mechanism to engage one of the gear rims 7, 11 and 15 with the output shaft assembly 6. Other two gear rims, which are not engaged to the output shaft assembly 6, should be free to rotate with respect to the output shaft assembly 6. Gear pair 7, 8, gear pair 11, 12 and gear pair 15, 16 are the eccentric gear pairs in FIG. 1. Theoretical lines of contact for different gear pairs are shown by 20, 21 and 22 in FIG. 1. Joint between gear rims 7, 11, 15 and the output shaft assembly 6 is not shown in the FIG. 1.

In FIG. 2, input shaft 4, which rotates freely in fixed part 3, is rigidly connected to eccentrics 7, 10 and 13. There are minimum three such similar shaft assemblies comprising of shaft 4 and eccentrics 7, 10 and 13. Axes of all the shafts 4 are parallel but all are not in the same plane. One of the shafts 4 is used as input shall Eccentrics 7, 10 and 13 on shaft 4, other than on the input shaft, are either free to rotate or rigidly connected to the shaft 4. On the shaft 4, which is used as input shaft, all the eccentrics 7, 10 and 13 are rigidly fixed. In the case where the eccentrics 7, 10 and 13 rotate freely on shaft 4, the shaft 4 can be fixed to part 3. Internal gear 5, 8 and 11 are held in S unchanged orientation with the help of eccentrics 7, 10 and 13 respectively. Eccentricities of 7, 10 and 13 are independent of each other but all the 7s should have approximately same eccentricity, similarly all 10s and all 13s should also have approximately same eccentricity respectively. External gears 6, 9 and 12 are free to rotate on the output shaft 1. One of the external gears 6, 9 and 12 can be engaged to output shaft 1 at a time by gear engagement mechanism 2. Shaft 4 and shaft 1 are supported in fixed body 3. Shaft 1 rotates free with respect to the fixed body 3. Gear engagement mechanism 2 can select any of the gear pair 5, 6, gear pair 8, 9 and gear pair 11, 12. As shown in the FIG. 2, if internal gear has M number of teeth and external gear has N number of teeth, where M>N, then the speed ratio obtained is N:(M−N).

In a different configuration based on FIG. 2, it is possible to keep the eccentrics 7, 10 and 13 to rotate freely on the input shaft 4 and use suitable engagement mechanism to engage only one of the eccentrics 7, 10 and 13 with the input shaft 4, in such case all other eccentrics 7, 10 and 13 are free to rotate on the respective shaft 4. In this case all the moving gears 6, 9 and 12 are to be fixed with the output shaft 1. Gear pair 5, 6, gear pair 8, 9 and gear pair 11, 12 are the eccentric gear pairs in FIG. 2. Theoretical lines of contact for different gear pairs are shown by 14, 15 and 16 in FIG. 2.

In FIG. 3, three driving gears 17, 18 and 19 are mounted on input shaft 1 in such a way that at any time only one of the driving gears can be engaged to shaft 1 through symbolic gear engagement mechanism 3, other driving gears rotate freely on the shaft 1. Output shaft 2 is rigidly connected to the three external moving gears 7, 11 and 15. Three eccentrics 5, 9 and 13 are either fixed or free to rotate on the support shaft 4. Shaft 4 is free to rotate with respect to the fixed support 20, 21, if any of the eccentrics 5, 9 and 13 is fixed on to the shaft 4. If the eccentrics 5, 9 and 13 are freely rotating on the shaft 4, then the shaft 4 can be fixed rigidly to the fixed support 20, 21. Minimum three assemblies of shaft 4 and the eccentrics 5, 9 and 13 maintain the orientation of the internal gear rims i.e. the fixed gears, 6, 10 and 14. The axes of these three similar assemblies of shaft 4 and eccentrics are parallel but not all are in the same plane. The point of contact between the gear pair 6, 7, gear pair 10, 11 and gear pair 14, 15 are moved by eccentric discs 8, 12 and 16 respectively. These eccentric discs 8, 12 and 16 are rigidly connected to gears driven by driving gears 17, 18 and 19. The axes of rotation of these driven gears and the eccentric discs 8, 12 and 16 are coincident with the axis of the output shaft 2. These driven gears and the eccentric discs are free to rotate on the output shaft 2. The eccentric discs 8, 12 and 16 are free to rotate with respect to the internal gear rims 6, 10 and 14 respectively, and thus move the point of contact on the pitch circle diameter of the fixed gears.

In another possibility, in FIG. 3, all the driving gears 17, 18 and 19 can be fixed to the input shaft 1 and the symbolic gear engagement mechanism 3 can be used to engage only one of the moving gears 7, 11 and 15 to output shaft 2, other two moving gears are free to rotate on the output shaft 2. As shown in the FIG. 3, if internal gear has M number of teeth and external gear has N number of teeth, where M>N, then the speed ratio obtained between the eccentric disc assembly and the output shaft is N:(M−N). It is important here that the eccentricities of the eccentric disc and the eccentrics should be approximately same for a particular gear pair, otherwise the eccentricities of the eccentrics are independent of each other. Gear pair 6, 7, gear pair 10, 11 and gear pair 14, 15 are the eccentric gear pairs in FIG. 3. Theoretical lines of contact for different gear pairs are shown by 22, 23 and 24 In FIG. 3.

In all the above-mentioned gearboxes additional eccentrics, eccentric parts and related identical gears, gear rims or eccentric gear pairs can be used simultaneously at appropriate phase difference. This may reduce vibration and increase balancing in the gearbox. For the parts, which are free to rotate, appropriate use of bearings will reduce friction. In above description gear teeth are not shown for simplicity of understanding. It is possible to employ two gear engagement mechanisms instead of one, this will make only one gear pair to get engaged at a time, other gear pair will be totally out of engagement, and thus may increase the life of the gearbox; this may introduce high impact at the time of changing the engaged gear pair. Proper lubrication scheme has to be worked out as per the specific application.

Advantages of the Eccentric Gearbox:

In an automobile if a turbine is to be used then immediately after the turbine output shaft one high ratio gear reduction is necessary. After this high ratio gear reduction conventional gearbox is to be used. This makes the total system unnecessarily bulky, instead, if the eccentric gearbox is used it will eliminate the use of conventional gearbox and will make the system more compact. In this type of eccentric gearbox, it is possible to have more than one speed ratios.

Disadvantages:

As many eccentrics are used and high input speed is involved, balancing of the gearbox has to be carried out very carefully.

The invention claimed is:

1. An eccentric gear box consisting of at least one gear engagement mechanism, at least two eccentric gear pairs with different ratios between number of teeth of its individual gears, at least one input shaft, at least one output shaft and multiple eccentrics;

wherein each eccentric gear pair consists of one circular gear, with internal gear teeth, in mesh with another circular gear with external gear teeth; wherein number of external gear teeth is less than the number of internal gear teeth; wherein one of the gears of eccentric gear pair is a revolving gear ad the other gear is a fixed orientation gear;

wherein multiple eccentrics are mounted on fixed orientation gear as to keep its orientation fixed while allowing its axis to revolve around the axis of revolving gear; revolving gear is free to revolve around its axis, which is common axis to all eccentric gear pairs; eccentrics associated with same eccentric gear pair have approximately equal eccentricity; individual eccentric revolves around its fixed axis and is free to revolve with respect to the associated fixed orientation gear;

wherein one eccentric associated with each fixed orientation gear is mounted on input shaft; wherein revolving gears associated with individual eccentric gear pairs, are connected to output shaft; at least one gear engagement mechanism is employed to select an eccentric gear pair to be effectively engaged between input shaft and output shaft as to revolve input and output shafts with speed ratio that is obtained from selected eccentric gear pair.

2. An eccentric gear box consisting of at least one gear engagement mechanism, at least two eccentric gear pairs with different ratios between number of teeth of its individual gears, at least one input shaft, at least one output shaft and multiple eccentrics;

wherein each eccentric gear pair consists of one circular gear, with internal gear teeth, in mesh with another circular gear with external gear teeth; wherein number of external gear teeth is less than the number of internal gear teeth; wherein one of the gears of the eccentric gear pair is a revolving gear and the other gear is a fixed orientation gear;

wherein multiple eccentrics are mourned on fixed orientation gear as to keep its orientation fixed while allowing its axis to revolve wound the axis of revolving gear; revolving gear is free to revolve around its axis, which is common axis to all eccentric gear pairs; eccentrics associated with eccentric gear pair have approximately equal eccentricity; individual eccentric revolves around its fixed axis and is free to revolve with respect to the associated fixed orientation gear;

wherein one eccentric associated with each eccentric gear pair is engaged with individual driving gear mounted on input shaft through a driven gear that is coaxially fixed with the eccentric; wherein revolving gears associated with individual eccentric gear pairs, are connected to output shaft; at least one gear engagement mechanism is employed to select an eccentric gear pair to be effectively engaged between input shaft and output shaft as to revolve input and output shafts with speed ratio that is obtained from selected eccentric gear pair.

3. The eccentric gear box as claimed in claim 1, wherein input shaft is rigidly connected to the eccentrics mounted on it; and the revolving gears are connected to output shaft in such a way that at a time the gear engagement mechanism can engage any one of the revolving gears to output shaft as to select speed ratio of any eccentric gear pair, between input shaft and output shaft, while rest of the revolving gears revolve freely with respect to output shaft.

4. The eccentric gear box as claimed in claim 1, wherein revolving gears are rigidly connected to output shaft and gear engagement mechanism engage input shaft wit at least one eccentric associated with any fixed orientation gear as to select speed ratio of any eccentric gear pair, between input shaft and output shaft, while eccentrics associated with other fixed orientation gears are free to revolve with respect to input shaft.

5. The eccentric gear box as claimed in claim 1, wherein two gear engagement mechanisms are employed to simultaneously engage input shaft with at least one eccentric and output shaft with the revolving gear associated with same eccentric gear pair; eccentrics and revolving gears associated with other eccentric gear pairs are free to revolve with respect to input shaft and output shaft respectively; this way only one of the eccentric gear pairs is engaged between input shaft and output shaft.

6. The eccentric gear box as claimed in claim 2, wherein input shaft is rigidly connected to the driving gears mounted on it; and the revolving gears are connected to output shaft in such a way that at a time the gear engagement mechanism can engage any one of the revolving gears to output shaft as to select speed ratio of any one eccentric gear pair, between input shaft and output shaft, while rest of the revolving gears revolve freely with respect to output shaft.

7. The eccentric gear box as claimed in claim 2, wherein revolving gears are rigidly connected to output shaft and gear engagement mechanism can engage input shaft with at least one driving gear mounted on it as to select speed ratio of any one eccentric gear pair, between input shaft and output shaft, while other driving gears mounted on input shaft and eccentrics associated with other eccentric gear pairs are free to revolve with respect to input shaft.

8. The eccentric gear box as claimed in claim 2, wherein two gear engagement mechanisms are employed to simultaneously engage input shaft with one driving gear mounted on it and output shaft with the revolving gear associated with same eccentric gear pair; other driving gears mounted on input shaft and eccentrics and revolving gears associated with other eccentric gear pairs are free to revolve with respect to input shaft and output shaft respectively; this way gear engagement mechanism at a time engages only one of the eccentric gear pairs between input shaft and output shaft.

9. The eccentric gear box as claimed in any of claims 1-8 that consists of at least one additional eccentric gear pair that is identical to one of the eccentric gear pairs of the eccentric gear box; wherein corresponding components of the identical eccentric gear pairs are simultaneously engaged to the input and output shafts respectively.

10. The eccentric gearbox as claimed in any of claims 1-8 in which the input shaft is used as output shaft and the output shaft is used as input shaft.

* * * * *

UNITED STATES PATENT AND TRADEMARK OFFICE
CERTIFICATE OF CORRECTION

PATENT NO. : 7,357,746 B2  Page 1 of 1
APPLICATION NO. : 10/520365
DATED : April 15, 2008
INVENTOR(S) : Vishvas Ambardekar It is certified that error appears in the above-identified patent and that said Letters Patent is hereby corrected as shown below:

Title Page; should read;

--(76) Inventor: Vishvas Prabhakar Ambardekar
Plot No. B-82, Flat No. 1,
Tulshibagwale Colony,
Sahakar Nagar No. 2,
Pune 411009,
INDIA--

Column 5, line 22; replace "ad" with --and--

Column 6, line 15; replace "wit" with --with--

Signed and Sealed this

Fifteenth Day of July, 2008

JON W. DUDAS
*Director of the United States Patent and Trademark Office*